(12) United States Patent
Wong (10) Patent No.: US 7,430,958 B2
(45) Date of Patent: Oct. 7, 2008

(54) DOUBLE BLADE PEELING DEVICE FOR VEGETABLES AND FRUITS

(76) Inventor: Yan Kwong Wong, Rm. 1016-17, Metro Centre II, 21 Lam Hing Street, Kowloon Bay, Kowloon (HK)

( * ) Notice: Subject to any disclaimer, the term of this patent is extended or adjusted under 35 U.S.C. 154(b) by 519 days.

(21) Appl. No.: 11/238,270

(22) Filed: Sep. 29, 2005

(65) Prior Publication Data

US 2006/0065134 A1 Mar. 30, 2006

(30) Foreign Application Priority Data

Sep. 30, 2004 (CN) .................... 2004 2 0104888 U (51) Int. Cl.
*A23N 7/00* (2006.01)
*A23L 1/216* (2006.01)

(52) U.S. Cl. .............................. 99/584; 99/633; 99/629; 99/539; 99/543; 99/546; 99/588; 99/589; 99/486; 99/488; 99/490; 99/492; 99/600; 99/643; 99/620; 99/630; 426/481; 426/482; 426/483

(58) Field of Classification Search .................. 99/584, 99/633, 629, 539–546, 588–9, 486–92, 600–643; 426/481–3

See application file for complete search history.

(56) References Cited

U.S. PATENT DOCUMENTS 4,442,764 A 4/1984 Bos et al.

FOREIGN PATENT DOCUMENTS

CN 2249552 Y 3/1997

*Primary Examiner*—Shawntina Fuqua
(74) *Attorney, Agent, or Firm*—Law Office of Sergei Orel, LLC (57) ABSTRACT

A double blade peeling device for vegetable and fruit comprises a handle attached to a vegetable and fruit retaining member and a body of screw, the handle can drive internal gears to rotate, so as to make the retaining member and the body of screw to rotate as well. The body of screw, which is provided with two screw threads, drives upper and lower blade carriers to move upward and downward oppositely, such that the blades mounted on the upper and lower blade carriers move downward and upward respectively, contact the rotating food frictionally, and peel vegetable or fruit from upside and underside simultaneously. When two blade carriers move to the intermediate position to complete the peeling action, the two blade carriers open through wedge in blade carrier devices, two blades leave the surface of food, the lower blade carrier devices disengage with the body of screw. The body of screw drives upper blade carrier device to press the lower blade carrier device to move downward unceasingly. When the upper and lower blade carrier devices move to bottom, if turning handle, the two blade carrier devices and the body of screw slip on the spot, that is a protective function, and a peeling cycle is completed. The invention can peel a vegetable or fruit conveniently, quickly and exactly, its operation is safe.

16 Claims, 10 Drawing Sheets

DOUBLE BLADE PEELING DEVICE FOR VEGETABLES AND FRUITS

FIELD OF INVENTION

The invention relates to a device for peeling food, in particular, to a double blade peeling device for vegetable and fruit.

BACKGROUND OF THE INVENTION

Double blade peeling device is mainly a device used for peeling vegetable and fruit. There is no any auto-peeling device for vegetable and fruit in the prior art. Up to date, two approaches are advanced to peel the vegetable and fruit. One is that food is peeled with common knife, but the approach has many disadvantages, besides it is slower and too much flesh is cut out, it still exits a risk to be cut, these problems can not be ignored.

In addition, another approach is by means of a hand-holding parer, which designed with two pieces of opposite V-shaped blades, there is a gap between them, If only placing the hand-holding parer on the surface of vegetable or fruit, with movement of the hand-holding parer, the peel of vegetable or fruit, that is in the gap, will be cut, the movement is repeated until the peel of vegetable or fruit is cut out completely. This approach improved the problem of that too much flesh is cut out to some extent, however there still exists many disadvantages, such as peeling in this way is still slower and the risk to be cut is in existence. The above cited problem is not solved thoroughly.

SUMMARY OF THE INVENTION

In view of the above problem, it is an object of present invention to provide a semiautomatic peeling device for vegetable and fruit, by turning the handle thereof the peel of vegetable or fruit will be cut out conveniently, quickly and exactly, and the operation is safe.

To achieve the desired object, the invention provides a double blade peeling device, which comprising: a lower cover disposed on bottom; a gear assembly mounted on said lower cover, through turning a handle the gears in said gear assembly can be driven to rotate; a retaining member for vegetable and fruit disposed on said gear assembly, vegetable or fruit mounted on said retaining member being rotated through driving said gear assembly; a housing disposed above said lower cover; a frame with two blade carriers being located on one end of the housing, said frame being provided with a body of screw, that can be driven by said gears assembly; a lower carrier device mounted on said frame and meshed with said body of screw, said lower carrier device being pressed against a rotating food and move upward; an upper carrier device mounted on said frame and meshed with said body of screw, said upper carrier device being pressed against the rotating food and move downward; and a pressure block mounted on the topmost end.

In the above double blade peeling device, said gears assembly is provided with a plurality of gears with different dentations, which engaged with each other such that all of gears can rotate synchronously, resulting in a gear of said body of screw and a small sector gear of said retaining member can rotates synchronously, while vegetable or fruit rotates, said body of screw rotates synchronously.

In the above double blade peeling device, said retaining member is just located in the center of the small sector gear, a lower axis is fitted in a through hole in a top element and a top support, on top of cylindrical body of said lower axis is provided with several steel needles, a narrower lower portion of the body is below a central hole of a cap element, an intermediate portion of the body is provided with a transverse axis, a lowermost end of the body is provided with a flat and rounded rectangle hole, which may engage with a metal pole projecting from an upper surface of gearbox, circular top of the top element extends outwardly and deviously and forms a cap-liked element, under the top element is provided with a top support, the cylindrical base of which extends and forms a lower edge, additionally, on both side of top end of the support are provided with fasteners, a pressure spring is located between the top element and the top support, below the top support is provided with a U-shaped mandrill.

In the above double blade peeling device, said housing is shaped as a calabash, a top surface of the housing is a circular and recessed open, that can contain the blade carrier, there are four boltholes at the four corners of said open, on the lower surface of the housing is provided with a through hole, through which the retaining member can be embedded into the lower cover.

In the above cited double blade peeling device, said body of screw is mounted on the intermediate portion of the frame, the intermediate section of said body of screw is provided with a bi-directional screw thread, two ends of the screw are a cylinder with a smaller diameter, the shape of the lower end is a circular, in which one small edge is cut, the lower end can be fit into an central hole of the gear of the body of screw, the upper and lower end of the body of screw are provided with a bushing, the front and rear of the frame is a front post and a rear post, both of which is a C-shaped, plastic plate.

In the above double blade peeling device, said lower blade carrier device comprises: a lower blade carrier, a lower blade stop knob, a lower slider seat, a lower torsion spring, a lower blade pivot, a lower toothed plate, a torsion spring for lower slider seat, and a cover plate for lower slider seat, In the above double blade peeling device, said lower blade carrier is hollow and arcuate, on a tail end of the lower blade carrier is provided with a lower pressure wheel, made of plastic, a front end of the lower blade carrier is provided with a lower blade seat, a lower blade front cover, a lower blade rest, a lower pivot for the blade rest, a lower blade and a lower roller, the lower blade seat is C-shaped, the center of which is provided with a through hole, the lower blade front cover is shaped to be inserted into the recess of the lower blade seat comlementary, a fastener of the front cover, which is projected from the bottom, just fits into said through hole, the lower blade rest is a rectangular plate, the center of which is provided with a hole, through which said lower blade pivot is attached to the blade rest and the front cover, the lower blade is a C-shaped one, which located on the bottom of said lower blade rest, the lower roller is just disposed in front of said lower blade. The distance between the lower roller and the lower blade is in proportion to the thickness of the peel, the rotation of the lower roller on the vegetable or fruit will expel the peel backwardly.

In the above double blade peeling device, the tail end of said lower stop knob is curved and located at lower toothed plate slider in the lower slider seat, the lower toothed plate slider is just above the lower toothed plate slide seat, the lower blade stop knob is attached to the low blade carrier through the lower knob pivot, allowing the lower stop knob swing upward and downward along the lower pivot, that is a metal shaft.

In the above double blade peeling device, said lower slider seat is provided with a through hole, on the lower portion of left side of the lower slider seat is provided with a lower torsion spring, a tail end of which is extended and formed as a pressure bar, said lower blade toothed plate is disposed in the lower slider seat, the V-shaped portion of said toothed plate surrounding the through hole of the lower slider seat, the tooth of said toothed plate protruding into the said through hole, a lower portion of left side the lower blade toothed plate is just against said pressure bar, the lower portion of right side of which protrudes and forms as an arcuate toothed plate slide seat, the top portion of right side of which protrudes and forms a trapeziform toothed plate control seat, on a lower portion of right side of the lower slider seat is provided with a inner pivot, said lower torsion spring is disposed in the arcuate and hollow portion of the lower blade carrier, the inner bushing of which is set on the inner pivot, so that the lower blade carrier and the lower blade stop knob is mounted on the same location, the downward extending pivot is mounted on a fulcrum, which is at lower portion of right side of the lower slider seat, the ring in tail end is formed as a outer bushing, which is just set on the outer pivot in the lower blade carrier.

In the above double blade peeling device, said cover plate of said lower slider seat is shaped as same as the shape of the lower slider seat, in the center of the cover plate is provided with a through hole, lower portion of left side of the cover plate is provided with a rectangular hole for restraining, on middle portion of right side of the cover plate is provided with a rectangular open for controlling, below the open is provided with a trapezium, upper wedge.

In the above double blade peeling device, said upper blade carrier device comprises: an upper blade carrier, an upper blade stop knob, an upper slider seat, an upper torsion spring, an upper knob pivot, an upper toothed plate, a tension spring for the upper slider seat, and a cover plate for the upper slider seat.

In the above double blade peeling device, said upper blade carrier is arcuate and hollowed, on the tail end of the upper blade carrier is provided with a pressure wheel of plastic, the front end of the upper blade carrier is provided with an upper blade seat, an upper blade front cover, an upper blade rest, an upper pivot for the blade rest, an upper blade and an upper roller, the upper blade seat is C-shaped, the center of which is provided with a through hole, the upper blade front cover is shaped to be inserted into the recess of the upper blade seat comlementary, a fastener of the upper front cover, which is projected from the bottom, just fits into said through hole, the upper blade rest is a rectangular plate, the center of which is provided with a hole, through which said upper pivot is attached to the blade rest and the front cover, the upper blade is a C-shaped one, which located on the bottom of said upper blade rest, the upper roller is just located in front of the upper blade. The distance between the upper roller and the upper blade is in proportion to the thickness of peel, the rotation of the upper roller on vegetable or fruit will expel the peel backwardly.

In the above double blade peeling device, the tail end of said upper blade stop knob is curved and located at the upper toothed plate slider in the upper slider seat, the upper toothed plate slider is just above the upper toothed plate slide seat, the upper stop knob is attached to the upper blade carrier through the upper knob pivot, allowing the upper stop knob swing upward and downward along the upper knob pivot that is a metal shaft.

In the above double blade peeling device, said upper slider seat is provided with a through hole, on upper portion of left side of the upper slider seat is provided with an upper tension spring, tail end of which is attached to a connector of the upper toothed plate, said upper toothed plate is disposed in the upper slider seat, the V-shaped outline of said plate surrounding the through hole, the tooth of the upper toothed plate protruding into the said through hole, on bottom of left side of the upper toothed plate is projected and formed an arcuate sliding seat, on top of left side of said upper toothed plate is the connector, on lower portion and left side of the upper slider seat is provided with an inner pivot, said upper tension spring is disposed in a arcuate and hollowed portion in the upper blade carrier, an inner bushing of which is set on the inner pivot, so that the upper blade carrier and the upper stop knob is mounted on the same location, the downward extending pivot is mounted on the fulcrum that is at lower portion of left side of the upper slider seat, the ring in tail end is formed as an outer bushing, which is just set on the outer pivot within the upper blade carrier.

In the above double blade peeling device, the upper cover plate of the upper slider seat is shaped as same as that of the upper slider seat, in the center of the upper cover plate is provided with a through hole.

In the above double blade peeling device, said through hole in the tail end of said upper pressure block is just set on said frame, in front end of said pressure block are provided with, from above to below, a handhold, compress spring, and an upper axis that can be rotated, the body of the handhold is cylinder, the top of which extending outward to form as a cap-liked structure, the compress spring is set on the narrower upper section of the upper axis, the bigger lower section of which is provided with a multiple of steel needles.

According to the present invention, a novel peeling device, that is simple and maneuverable, is provided, it is by turning the handle that the internal gear will rotate, so that vegetable or fruit mounted on the retaining member rotates, the body of screw provided with two threads rotate synchronously, to drive the upper and lower blade carriers that are mounted on the body of screw move oppositely through right-hand and left-hand threads, which results in the blades that are mounted on the upper and lower blade carriers move upward and downward respectively, and to contact the rotating food frictionally, at the same time performing the peeling action from the top and the bottom; when the two blade carriers move to the intermediate position, that is, the peeling action is completed, the wedge in the blade carrier device makes the two blade carriers open, the blades are away from the surface of food. Then, the lower blade carrier device disengages with the body of screw, the body of screw drives the upper blade carrier to press against the lower blade carrier to move downward continuously, when the upper and lower blade carriers move to the bottom, if turning the handle, both of blade carriers and the body of screw slide on the spot, that is a protective function for blades, the circle of peeling is completed.

The invention overcomes the disadvantages of conventional peeling device in the prior art, the conventional peel device for vegetable and fruit is slower and too much flesh is cut out, there exist the risk to be cut as well.

BRIEF DESCRIPTION OF THE DRAWINGS

FIGS. 31 (A), (B), (C) are schematic view of the body of screw, which is engaged with teethed plate of upper/lower blade carriers;

FIGS. 32 (A), (B), (C) are schematic view of operation of the double blade peeling device according to the invention.

DETAIL DESCRIPTION OF THE INVENTION

Figure 1:
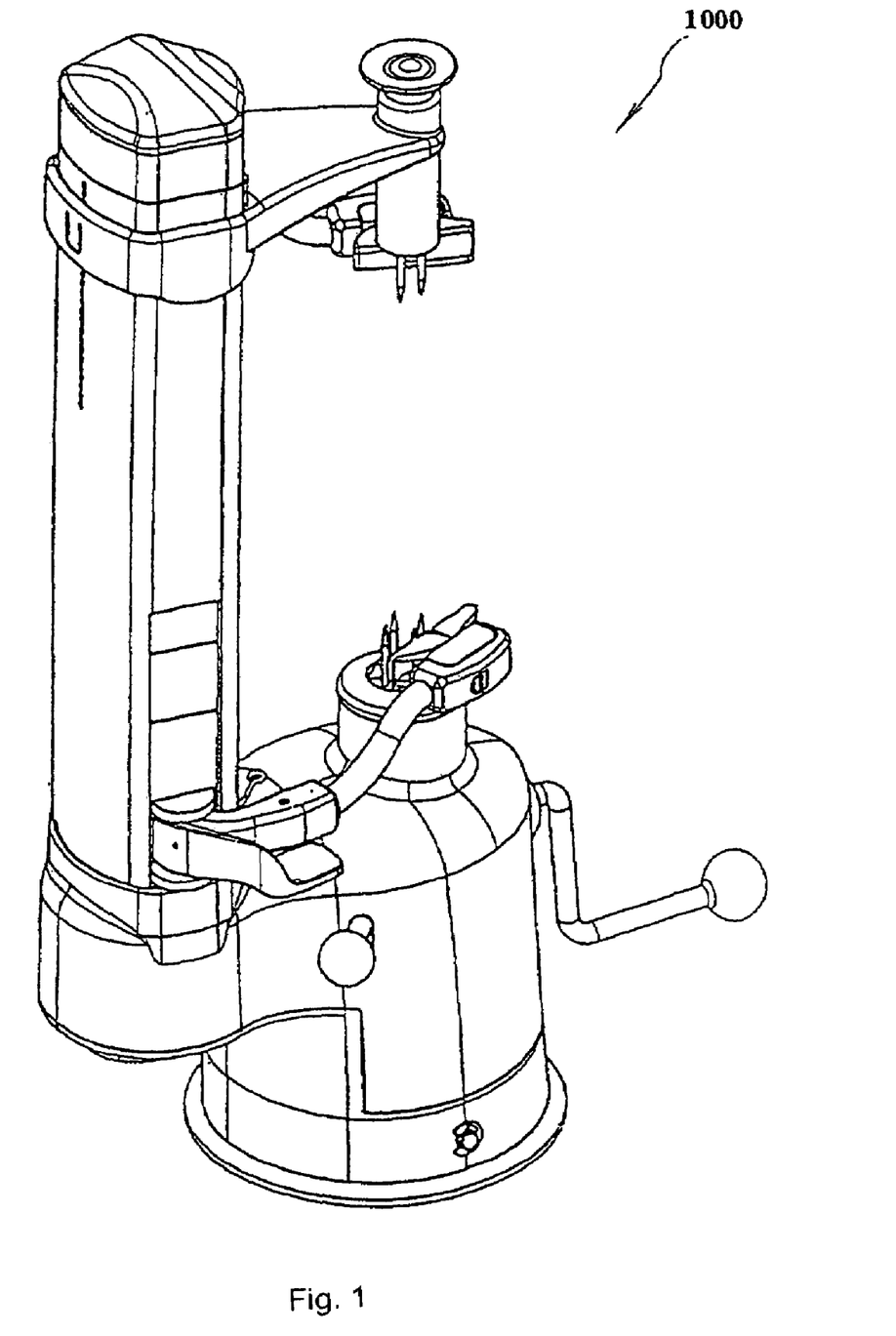
FIG. 1 is a schematic, perspective view of a double blade peeling device according to the invention.
Figure 2:
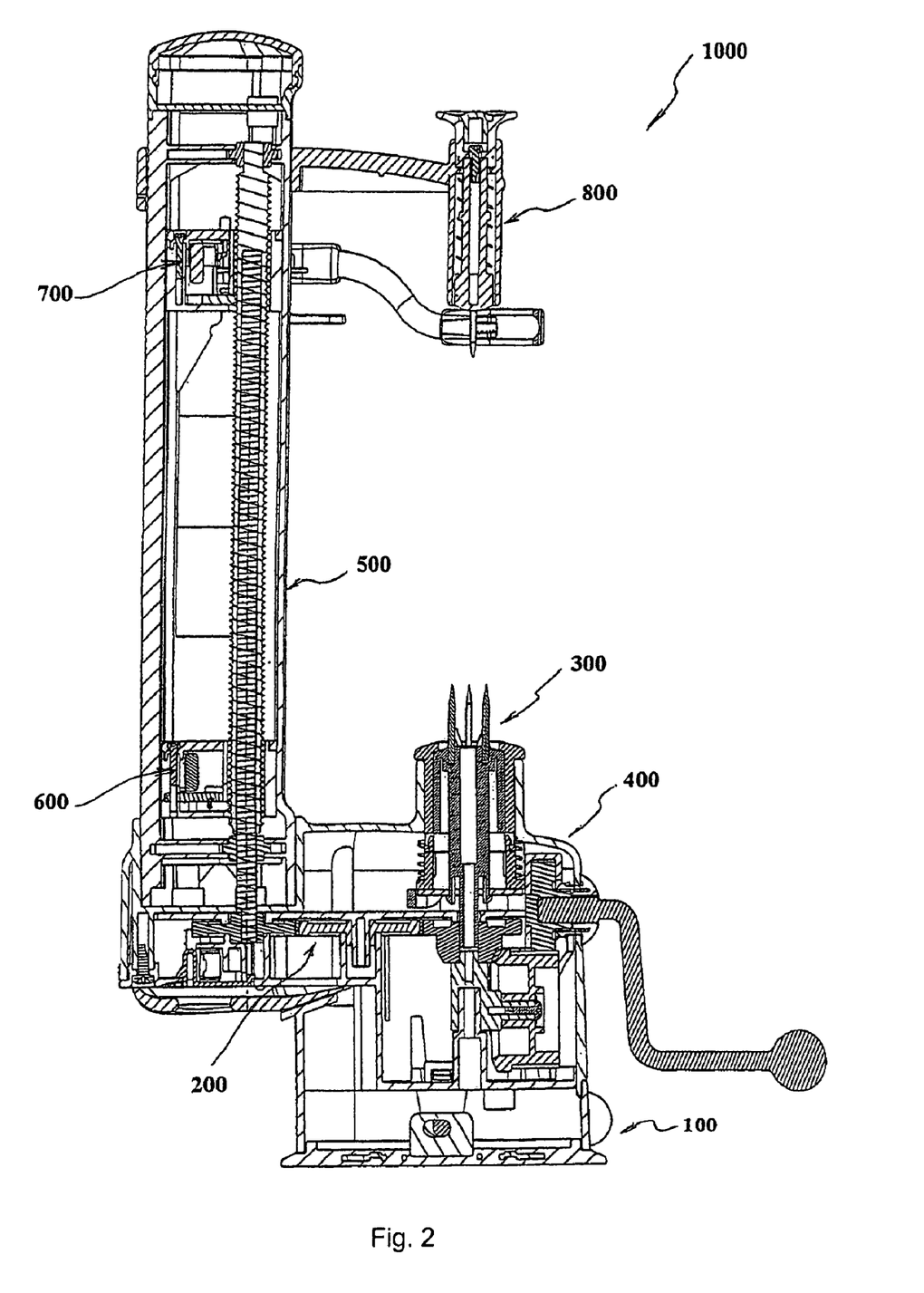
FIG. 2 is a side sectional view of a double blade peeling device according to the invention.

Firstly, referring to FIGS. 1 and 2, FIG. 1 illustrates a schematic, perspective view of the double blade peeling device according to the invention. FIG. 2 illustrates a side view of the double blade peeling device according to the invention. The device comprises a lower cover 100 disposed at bottom; a gear assembly 200 mounted in the lower cover 100; a retaining member 300 disposed above the gear assembly 200; a housing 400 disposed above lower cover 100; a frame 500 located at one end of the housing 400; a lower blade carrier device 600 and an upper blade carrier device 700 provided in the frame 500; and a pressure block 800 mounted on the topmost end of the double blade peeling device 1000.

Figure 3:
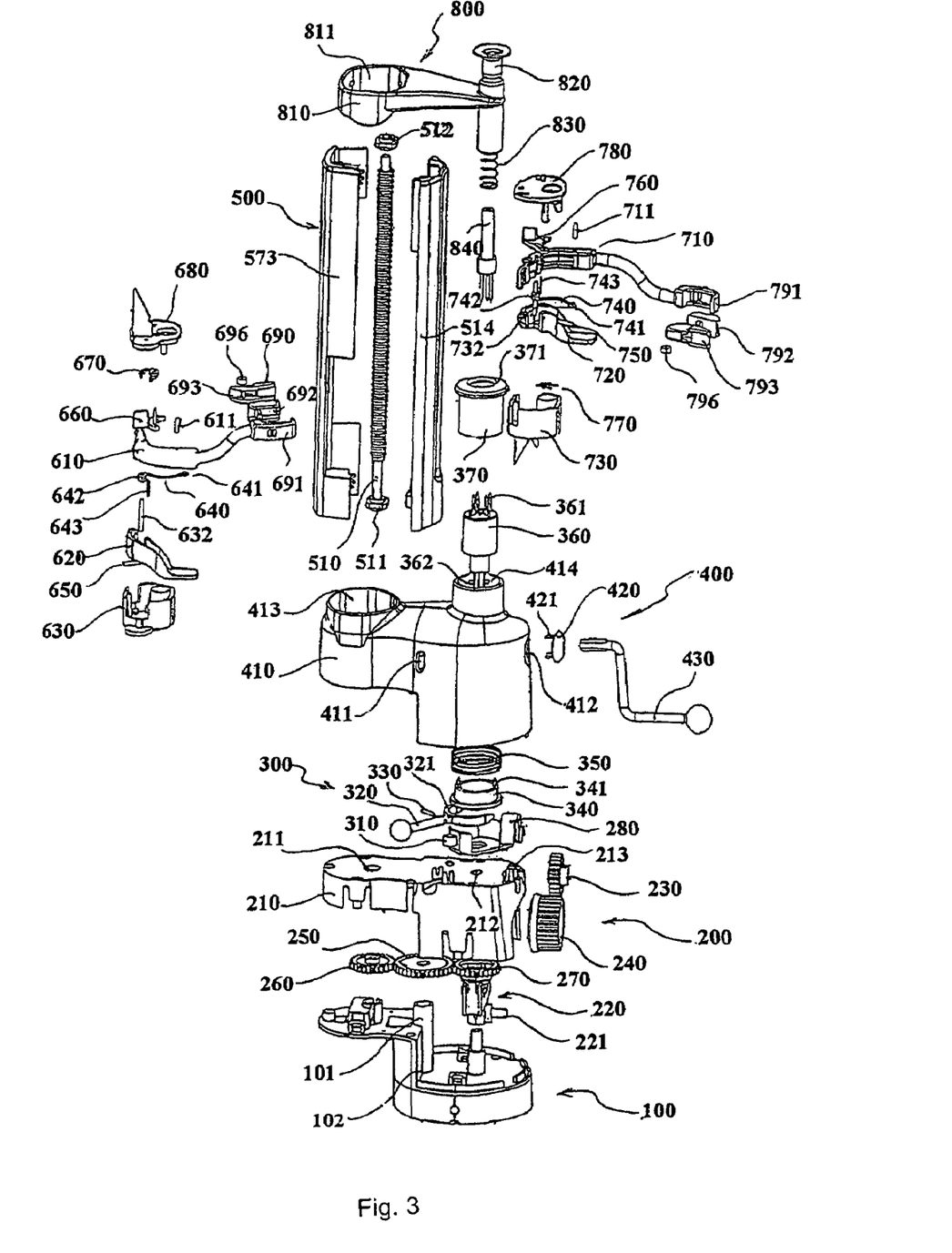
FIG. 3 is an explosive, perspective view of a double blade peeling device according to the invention.
Figure 4:
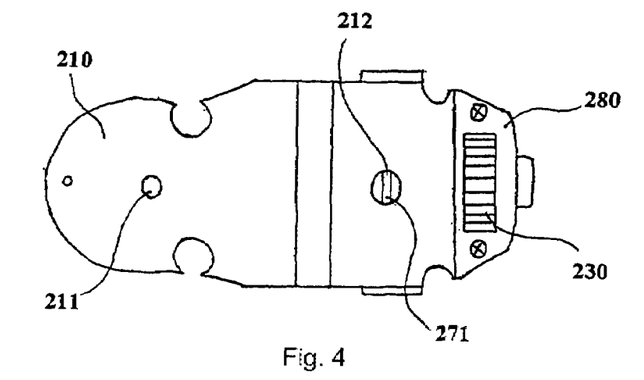
FIG. 4 is a top view of handle axis seat of a double blade peeling device according to the invention.
Figure 5:
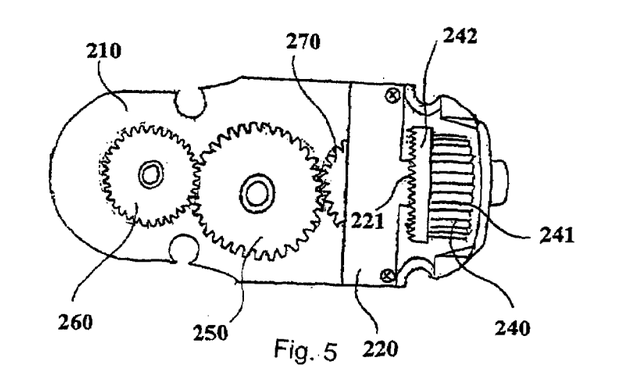
FIG. 5 is a bottom view of a handle axis seat of FIG. 4.
Figure 6:
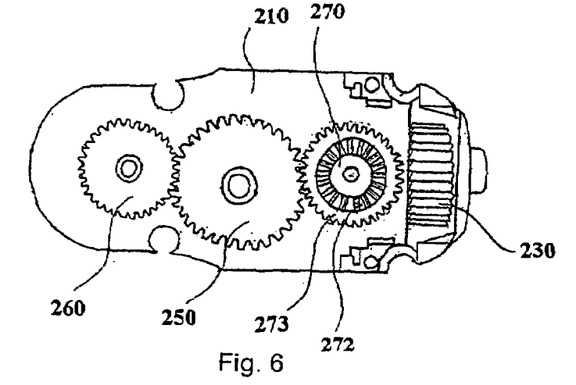
FIG. 6 is a view of the handle axis seat of FIG. 5, in which a sector gear and its mounting seat are removed.
Figure 7:
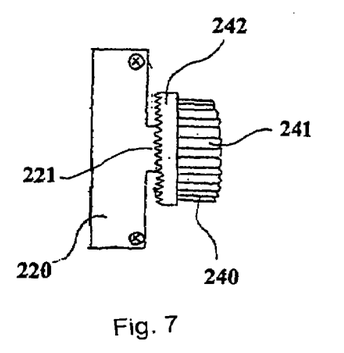
FIG. 7 is a partial view of the sector gear and mounting seat of FIG. 5.

Now referring to FIG. 3, FIG. 3 is an explosive, perspective view of the double blade peeling device 1000 according to the invention. The figure illustrates the position and the parts of above described eight subassemblies. The lower cover 100 is disposed at bottom, the surface of lower cover is shaped as a calabash. The top surface of the lower cover is higher than its bottom surface. On the center of the top surface is provided with a cylinder 101. On the lower cover 100 an upper cover 210 of gearbox is fitted, on the center of top and bottom of the upper cover 210 a rounded hole is provided, which is referred to as hole 211 for body of screw and hole 212 for retaining member, respectively. The bottom of the upper cover of gearbox is opened and formed a notch 213 for the gear of handle. In addition, a gear 260 of body of screw, an idler wheel 250 and a sector gear 270 are provided underside of the upper cover 210 at top, middle and lower positions thereof, respectively. In the top end of sector gear 270 is provided with a bracket 220 used for mounting the gear 270. One end of the bracket 220 is provided with a cylinder, that may be functioned as a central axis 221 of a bigger sector gear 240. The gear 230 of handle is just provided in the notch 213. An upper cover 280 is provided on the central gear 230. The central axis of the sector gear 270 is a metal shaft 271 with thread (see FIG. 4), the top of which is shaped as flat and rounded rectangular, and projecting from the surface of the upper cover of the gearbox 210. The retaining member 300 is just located in the center of the sector gear 270. The downmost end of retaining member is provided with a capping 310, the shape of which is rectangular with two rounded sides, a circular part extends upward and projected outward from the bottom of the capping 310. A screw hole 311 for the capping is provided in the circular part. (see FIGS. 11 and 12), which is used for coupling to the top cap 410. The top cap 410 is shaped as a calabash, in the upper surface of the top cap is provided with a circular recessed open 413, at the four corner position of the open are provided with four screw holes 415 respectively (see FIG. 14). On the bottom surface of the top cap is also provided with a circular mounting hole 414, through which the part of retaining member 300 is fitted into the top cap 410. A circular top element 370 is provided with of the part, the cylinder top of the top element 370 is extended outward and formed as a flange 371, under the top element 370 is provided with a top support 340, the cylinder bottom of which is extended and formed as a flange, both sides of upper end of the top support are provided with two fastener 341. Between the top element 370 and top support 340 is a compression spring 350. Below of the top support 340 is a mandrill 320 provided with a U shaped element 321. In the hole that passes through the top element 370 and top support 340 is a lower axis 360 for mounting vegetable or fruit, on top the cylinder body of the lower axis is provided with several steel needles 361. A narrow lower portion of the cylindrical body exceeds a central hole of capping, an intermediate portion of the cylindrical body is provided with a transverse pole 362, a lowermost end of the cylindrical body is provided with a flat and rounded rectangle hole 363 (see FIGS. 11 and 12). The hole 363 is engaged with a metal pole 271 projecting from an upper surface of gearbox. At the two locations on the side of top cover 410 are provided with a hole respectively. One is referred to as hole 411 for mandrill, which allow for the mandrill 320 to rotate. Another hole is referred to as hole 412 for handle, which allow for the handle 430 to rotate. On the surface of hole 412 is provided with a cover plate 420, on the oblong surface of which is provided with two fasteners 421.

The parts used for peeling will be described as below. Above the open 413 is provided with a frame 500 for the double blade carriers. In the center of the frame is provided with a body of screw 510, in the middle section of the body of screw is provided with threads, the two ends of which is smaller, the lower end of which is shaped as a circular, with one side cut. The lower end is just fitted into the center of the gear 260. At the upper and lower ends of the body of screw 510 are provided with bushings 512 and 511 respectively. In front and rear of the body of screw are provided with a front post 514 and back post 513 respectively. Both of the posts are made of C-shaped plastic plate. In the middle of the front post 514 and the back post 513 are provided with an upper blade carrier device 700, that is comprised of upper blade carrier, an upper blade stop knob and an upper slider seat; and a lower blade carrier device 600, that is comprised of a lower blade carrier 610, a lower blade stop knob 620 and a lower slider seat 630. These two devices are assembled around the body of screw 510. The lower slider seat 630 is shaped as rectangular with two sides rounded, in the position near the front of the center of the lower slider seat 630 is provided with a through hole 631 (see FIG. 19), the lower part of left side of the slider seat 630 is mounted with a torsion spring 670 by a screw (see FIG. 19). A straight metal bar is extended from the tail end of the spring, the bar is referred to as lower pressure bar 671 (see FIG. 19). A lower toothed plate 660 (see FIG. 19) is also disposed in the lower slider seat 630, the v-shaped part of the toothed plate surround the through hole 631, a portion of which is extended into the through hole 631, the portion is referred to as bulge 661 (see FIG. 19). The bottom of left side of the V-shaped part is just against said lower pressure bar 671, the bottom of right side of the V-shaped part extrudes to form as a curved toothed plate sliding seat 662 (see FIG. 19), the top of right side of the V-shaped part extrudes to form as a trapeziform toothed plate control seat 663 (see FIG. 19). The lower portion of right side of the lower slider seat 630 is provided with a cylinder inner axis 632 (see FIG. 19). The curved lower blade carrier and the low blade stop knob are coupled through the inner axis 632 that traverses both of them. A lower torsion spring 640 locates in the arcuate and hollow portion of the lower blade carrier 610, the inner bushing 642 of the torsion spring is set on the inner axis 632, so that the lower blade carrier 610 and the lower blade stop knob 620 is located at the same position, the downward extending lower support 643 is fixed in a hole that is on the lower portion of right side of the lower slider seat, the hole is referred to as lower fulcrum (see FIG. 19). Another end of the spring extends outward along the lower blade carrier 610 to the intermediate position, the ring formed on the end is outer bushing 641 for the lower blade carrier. The bushing is just set on the outer pivot 611 that is in the lower blade carrier 610. The tail end of the lower blade carrier 610 is provided with a pressure wheel 612 of plastic (see FIG. 18), the location of which is just under the lower control hole 682 (see FIG. 22).

On the other hand, low blade stop knob 620 is coupled to the lower blade carrier through the lower knob pivot 650, such that the lower blade stop knob 620 can swing along the pivot 650 upward and downward, to control the engagement or disengagement of the lower blade toothed plate 660 and the body of screw 510. The tail end of the lower blade stop knob is arcuate and disposed into the lower slider seat 630, the tail end is referred to as pressure slider 621 (see FIGS. 17 and 18), the location of which is just above the toothed plate slider seat 662. The front end 690 of the lower blade carrier is comprised of lower blade seat 691, lower blade cover 692, lower blade rest 693, pivot 694 for the blade rest (see FIGS. 15 to 18), lower blade 695 (see FIGS. 15 to 18) and lower roller 696. The lower blade seat 691 is C-shaped, the center of which is provided with a through hole. The lower blade cover 692 is shaped to be just inserted into the recess of the lower blade seat 691 comlementary. The fasteners projected from bottom is just fitted into the said through hole. The lower blade rest 693 is a rectangular plate with a hole at the center, the pivot 694 for the blade rest passes through the aforesaid hole to couple the blade rest 693 to the lower blade cover 692. The lower blade 695 is a C-shaped blade, the location of which is under the lower blade rest 693. The lower roller 696 is just located in front of the blade 695. The top of the lower slider seat 630 is covered with a lower cover plate 680, the shape of which is as same as that of the lower slider seat 630. Similarly, in the front end of the lower slider seat is provided with a circular through hole 681 (see FIG. 22). On the lower portion of left side of the lower cover plate 680 is a lower blade control hole 682 (see FIG. 22), the shape of which is rectangular. On the central position of right side of the lower cover plate is a rectangular control open 683 (see FIG. 22) for the toothed plate. Beneath the open is a projected trapeziform wedge 684 (see FIG. 22), which is referred to as upper wedge.

Above the lower blade carrier device 600 is an upper blade carrier device 700. Basically the structure of these two devices is very similar. The upper slider seat 730 is in a form of rectangular with two sides rounded. In the position near the center of the upper slider seat 730 is provided with a through hole 731 (see FIG. 25), the upper part of left side of the slider seat 730 is mounted with a tension spring 770 (see FIG. 25) by a screw, the tail end of the spring is coupled to a upper toothed plate connector 763. On the bottom of the upper slider seat 730 are provided with two projected trapeziform wedges, the bigger one at the lower part of left side is a lower blade wedge 734 (see FIGS. 26 and 27), another smaller one is located at center of right side, which is referred to as lower toothed plate control wedge 735 (see FIGS. 26 and 27). The two wedges 734 and 735 are just coupled to said lower blade control hole 682 and lower blade toothed plate control open 683, respectively. The lower portion of the lower blade toothed plate control wedge 735 is a rectangular hole, which is referred to as the upper blade control hole 736 (see FIG. 25), which is just coupled to said upper blade wedge 684 comlementary. Additionally, an upper teeth plate 760 (see FIG. 25) is also disposed in the upper slider seat 730, the V-shaped part of which surrounds the through hole 731, a portion of which is extended into the through hole 631, the portion is referred to as bulge 761 (see FIG. 25). The bottom of left side of the V-shaped part is extruded to form as a curved upper toothed plate sliding seat 762 (see FIG. 25). The lower portion of left side of the upper slider seat 730 is provided with a cylinder inner axis 732, the curved upper blade carrier 710 and the upper blade stop knob 720 are coupled through a pivot 750 that pass across both of them, so that the upper blade stop knob 720 can swing along the pivot 750 upward and downward to control the engagement or disengagement of the upper blade toothed plate 760 and body of screw. The tail end of the upper blade stop knob 720 is curved and located in the upper slider seat 730, which is referred to as upper toothed plate pressure slider 721 (see FIGS. 17 and 18), which is just located above the upper blade toothed plate sliding seat 762. An upper torsion spring 740 is located in the arcuate and hollow portion of the upper blade carrier 710, the inner bushing 742 of the spring is set on the inner axis 732, so that the upper blade carrier 710 and upper blade stop knob 720 are mounted on the same position, the downward extending upper support 743 is fixed in a hole that is at the lower portion of left side of the upper slider seat, the hole is referred to as upper fulcrum 733 (see FIG. 25). The another end of the spring extends outward along the upper blade carrier 710 to the intermediate position, the ring in the end is outer bushing 641 for the upper blade carrier, the bushing is just set on the outer pivot 711 that is within the upper blade carrier 710. The tail end of the upper blade carrier 710 is provided with a pressure wheel 712 of plastic (see FIG. 18), the location of which is just above the upper blade control hole 736 (see FIG. 25).

The front end of the upper blade carrier 710 is provided with an upper blade seat 791, an upper blade cover 792, an upper blade rest 793, an upper pivot 794 for the upper blade rest (see FIGS. 15 to 18), upper blade 795 (see FIG. 15 to 18), and an upper roller 796. The upper blade seat 791 is C-shaped, the center of which is provided with a through hole, the upper blade cover 792 is shaped to be just inserted into the recess of the upper blade seat 791 comlementary. The fasteners projected from bottom are just fitted into said through hole. The upper blade rest 793 is a rectangular plate with a hole in the center, through the hole the pivot 794 for the blade rest pass to couple the blade rest 793 and the upper blade cover 792. The upper blade 795 is a C-shaped blade, the location of which is under the upper blade rest. The upper roller 796 is just located in front of the upper blade 795. The top of the upper slider seat 730 is covered with upper cover plate 780, the shape of which is as same as that of the upper slider seat 730. Similarly, in the front end of the upper cover plate is provided with a circular through hole 781. On the upper blade carrier device 700 is a upper pressure block 810, the through hole 811 at the tail end of the pressure block 810 can be set on the frame 500. At the front end of the pressure block 810 is provided with, from the top down, a handhold 820, a compression spring 830 and an upper axis 840. The handhold 820 is cylinder, the top end of which is extended outward to form as a cap structure. The compression spring 830 is set on the narrower upper part of upper axis 840. The wider lower part of the upper axis is provided with several steel needles.

Figure 8:
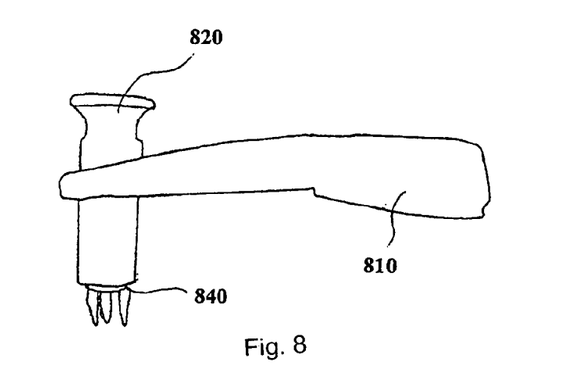
FIG. 8 is a side view of a mounting arm of the double blade peeling device according to the invention.
Figure 9:
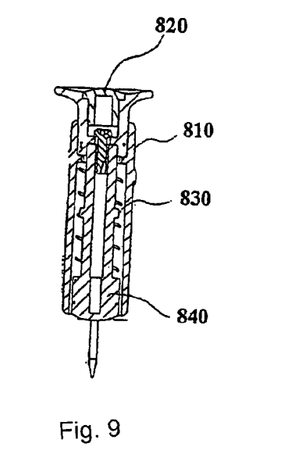
FIG. 9 is a sectional view of a mounting arm of the double blade peeling device according to the invention.
Figures 10, 11:
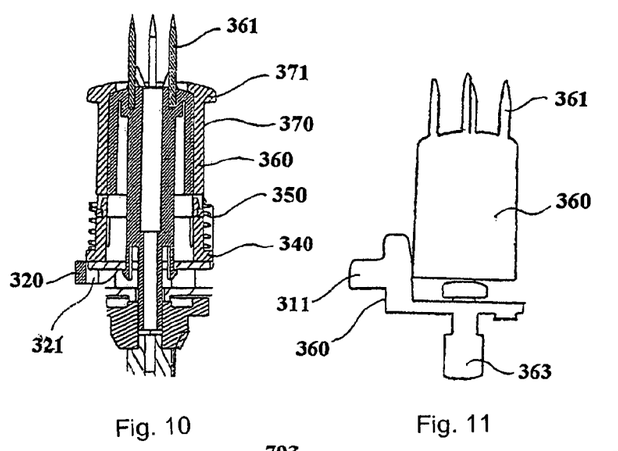
FIG. 10 is a side sectional view of a retaining member of the double blade peeling device according to the invention.
FIG. 11 is a side view of a lower axis and capping of the retaining member of FIG. 10.
Figure 12:
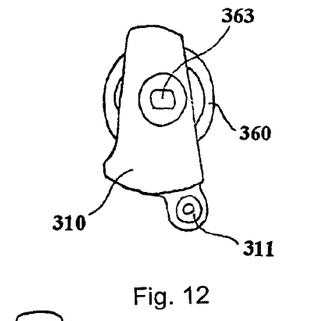
FIG. 12 is a bottom view of a lower axis and capping of the retaining member of FIG. 10.
Figure 13:
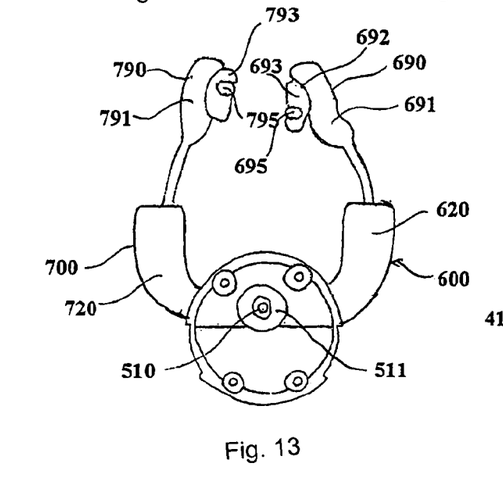
FIG. 13 is a bottom view of a frame, provided with two blade carriers, of the double blade peeling device according to the invention.
Figure 14:
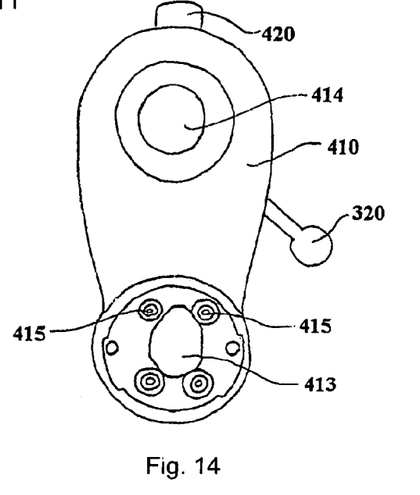
FIG. 14 is a top view of a top plate and a mandrill of double blade peeling device according to the invention.
Figures 15, 16, 17, 18:
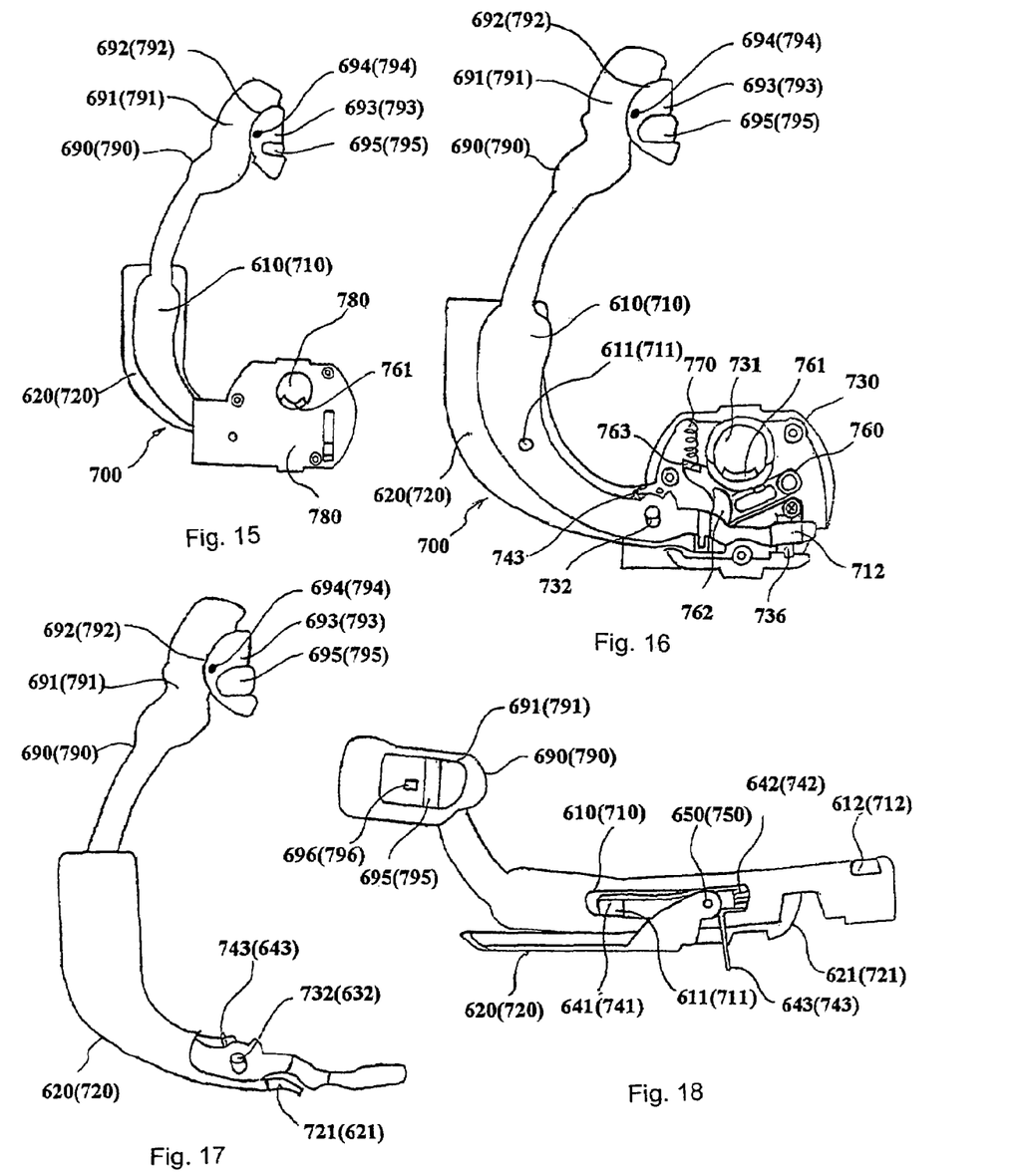
FIG. 15 is a top view of the upper/lower blade carrier, upper/lower blade stop knob and upper/lower slider seat within the frame illustrated in FIG. 13.
FIG. 16 is a view of the configuration of the upper/lower blade carrier, upper/lower blade stop knob and upper/lower slider seat illustrated in FIG. 15.
FIG. 17 is a top view of the upper/lower blade carrier and the upper/lower blade stop knob of FIG. 15.
FIG. 18 is an elevation view of the upper/lower blade carrier and the upper/lower blade stop knob of FIG. 15.
Figure 19:
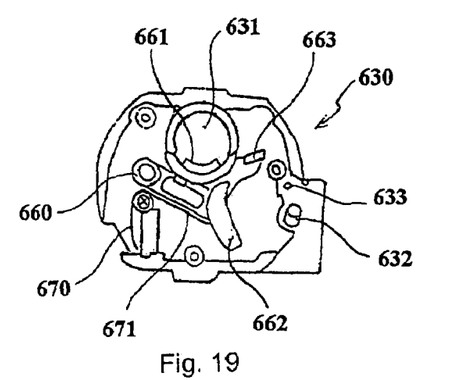
FIG. 19 is a top view of configuration of the lower slider seat within the frame of FIG. 13.
Figure 20:
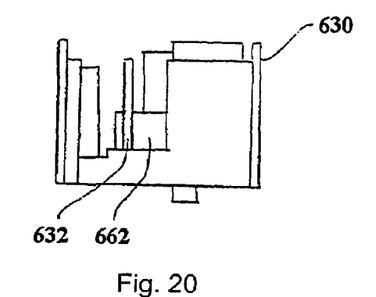
FIG. 20 is a side view of the lower slider seat of FIG. 19.
Figure 21:
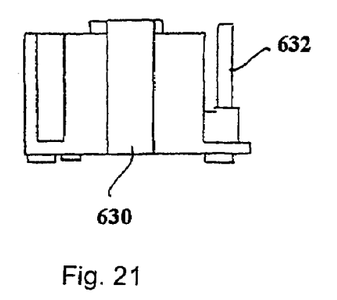
FIG. 21 is an elevation view of the lower slider seat of FIG. 19.
Figure 22:
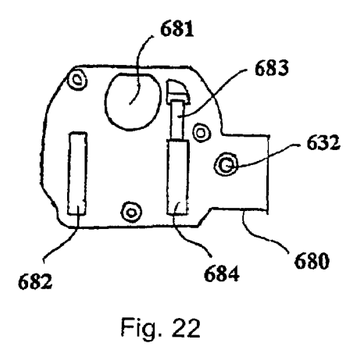
FIG. 22 a bottom view of configuration of the lower cover plate within the frame of the FIG. 13.
Figure 23:
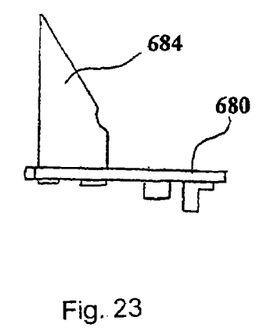
FIG. 23 is a side view of the lower cover plate of FIG. 22.
Figure 24:
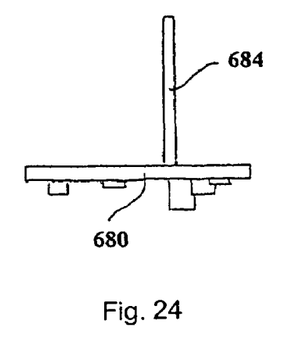
FIG. 24 is an elevation view of the lower cover plate of FIG. 22.
Figure 25:
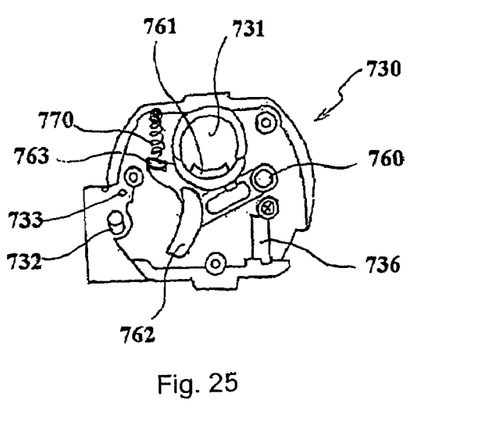
FIG. 25 is a top view of configuration of the upper slider seat within the frame of FIG. 13.
Figure 26:
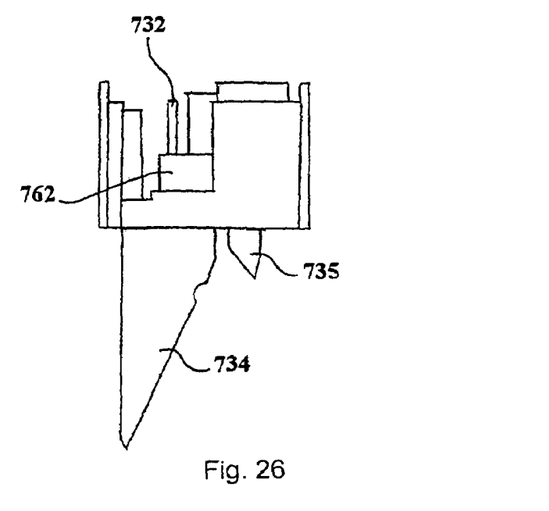
FIG. 26 is a side view of the upper slider seat of FIG. 25.
Figure 27:
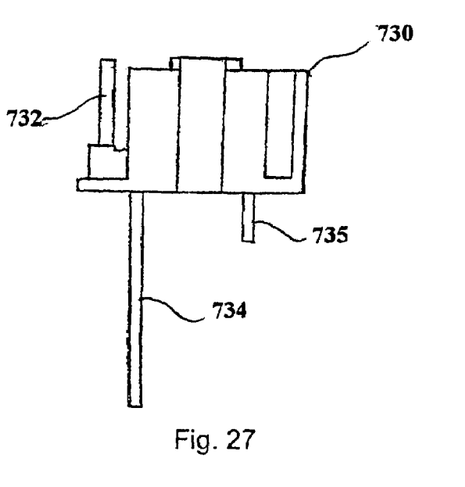
FIG. 27 is an elevation view of the upper slider seat of FIG. 25.
Figure 28:
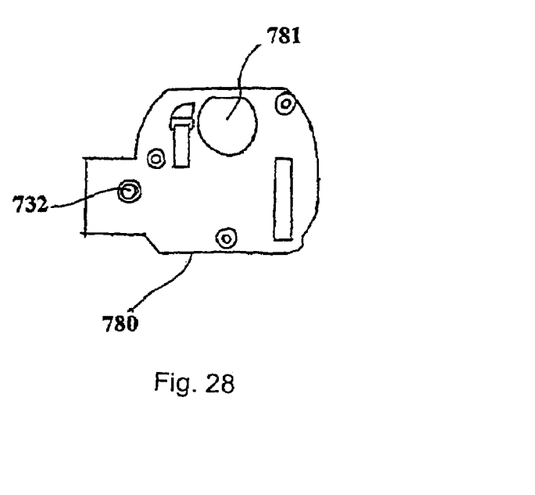
FIG. 28 is a bottom view of configuration of the upper cover plate within the frame of FIG. 13.
Figure 29:
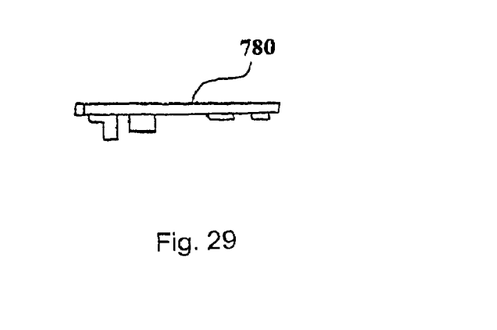
FIG. 29 is a side view of the upper cover plate of FIG. 28.
Figure 30:
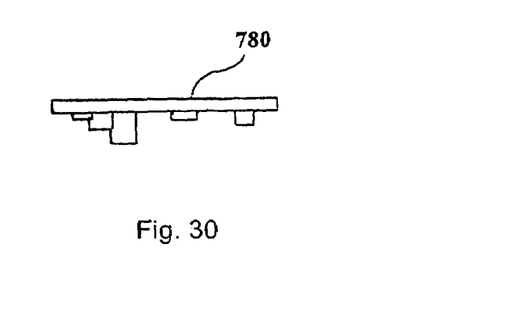
FIG. 30 is an elevation view of the upper cover plate of FIG. 28.
Figures 31A, 31B:
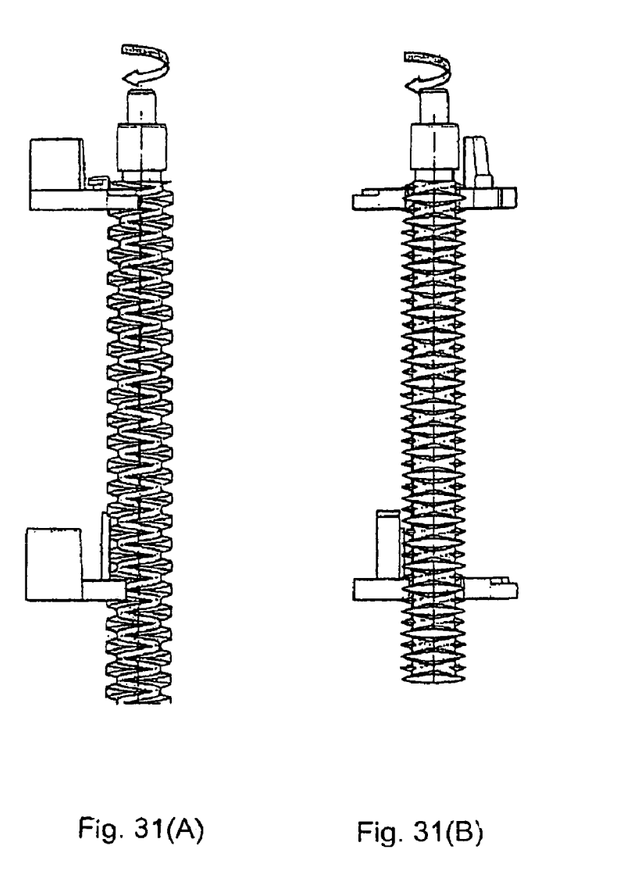
Figure 31C:
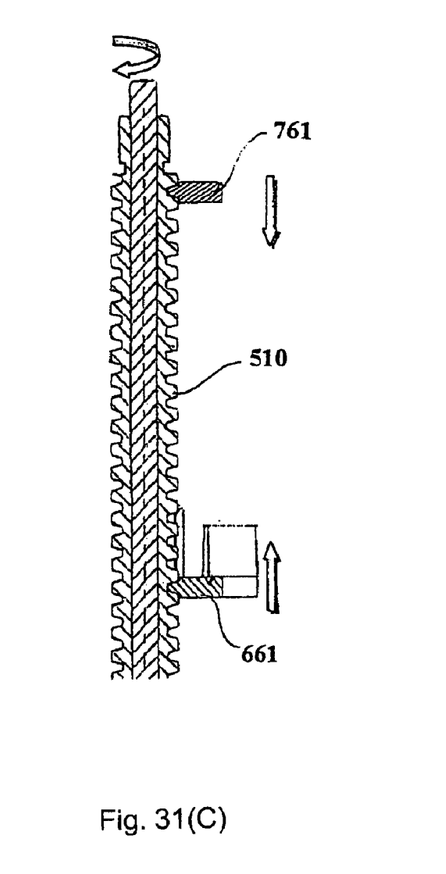

Next referring to FIGS. 4 to 31, which illustrate the view of various assemblies of the invention at different angles. FIGS. 4 to 7 show a gear assembly 200, in which the sector gear 270 and sector gear 240 are provided with two types of dentations respectively, including a straight tooth 272 and a skewed tooth 273 for sector gear 270, and a straight tooth 241 and a skewed tooth 242 for sector gear 240. FIGS. 8 and 9 illustrate the upper pressure block 800. FIGS. 10 to 12 illustrate a retaining member 300. FIG. 13 illustrates the bottom view of frame 500 provided with two blade carriers, including a lower blade carrier device 600 and an upper blade carrier device 700. FIG. 14 illustrates a housing 400 and a mandrill 320. FIGS. 15 and 16 illustrate the upper blade carrier device 700 and the lower blade carrier device 600. FIGS. 17 and 18 illustrate the upper blade carrier 710 and upper blade stop knob 720, lower blade carrier 610 and lower blade stop knob 620. FIGS. 19 to 21 illustrate a lower slider seat 630, a lower toothed plate 660 and a lower torsion spring 670 for the lower slider seat. FIGS. 22 through 24 illustrate a lower covering plate 680. FIGS. 25 through 27 illustrate an upper slider seat 730, an upper blade toothed plate 760 and a tension spring 770 for upper slider seat. FIGS. 28 through 30 illustrate an upper covering plate 780 for the upper slider seat. FIGS. 31 (A) to (C) illustrate the engagement of the body of screw 510 with the tooth 761 of upper blade toothed plate and the tooth 661 of the lower blade toothed plate. The body of screw 510 is provided with bi-directional threads, the tooth 661 of lower blade toothed plate is dextral, the tooth 761 of upper blade toothed plate is sinistral. Thereby, when the body of screw, for example, rotates clockwise as illustrated, the dextral tooth 661 of the lower blade toothed plate will move upward, however, the sinistral tooth 761 of the upper blade toothed plate will move downward.

Figure 32A:
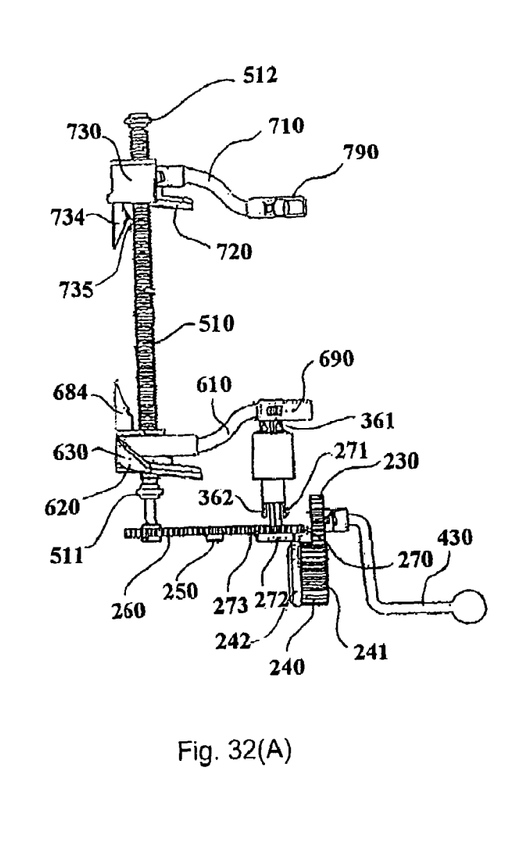
Figure 32B:
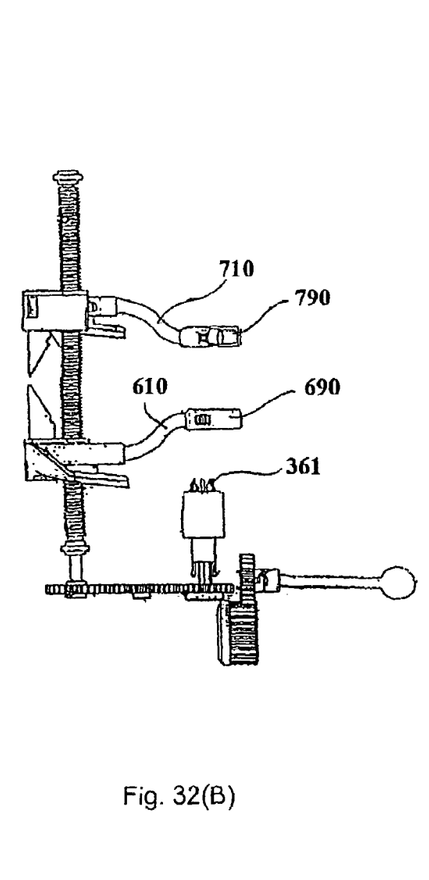
Figure 32C:
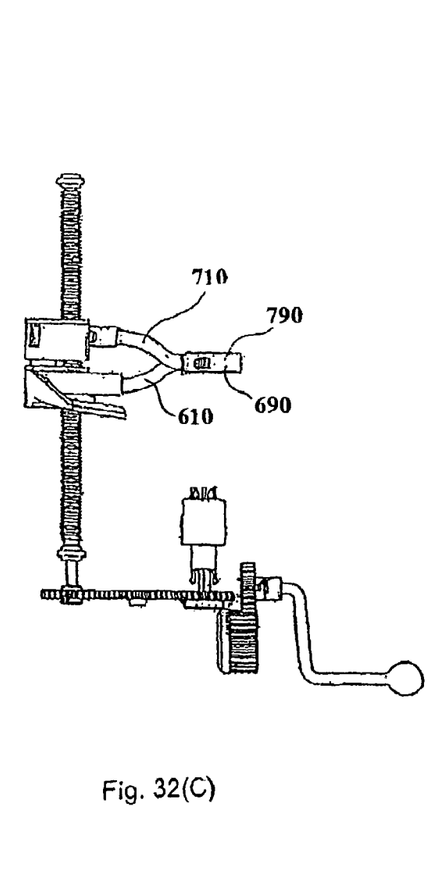

Next referring to FIGS. 32 (A), (B), (C), which illustrate the schematic view of operation of the double blade peeling device. All of the operational process are illustrated in order of (A) to (C). FIG. 32 (A) illustrates an original state of the double blade peeling device 1000 according to the invention. Firstly, the vegetable or fruit is mounted between the retaining member 300 and the upper pressure block 800 by putting the vegetable or fruit on the lower axis 360, the vegetable or fruit will be fixed on the steel needles. On the other hand, the upper pressure block 800 is pulled downward until the upper axis 840 fix up vegetable or fruit from the top. When peeling begin, by turning the handle 430, which engaged with the retaining member 300 and the body of screw 510, the central gear 230 of the handle rotate along with. Duo to the tooth of central gear 230 is meshed with the straight tooth 241 of sector gear 240, the skewed tooth 242 of sector gear 240 is meshed with the straight tooth 272 of the sector gear 270, turning of the handle 430 will drive the sector gear 270 to rotate, so that rotation of metal pole 271 will result in the lower axis 360 to rotate, the steel needles 361, which fixing vegetable or fruit to the axis, cause the vegetable or fruit to rotate. The transverse pole 362 is functioned as to make the lower axis 360 in position, so that the vegetable or fruit does not swing transversely. In addition, due to the transverse tooth 273 of sector gear 270 is meshed with the tooth of the intermediate gear 250, the tooth of gear 260 of body of screw is meshed with the tooth of the intermediate gear 250, turning of the handle 430 will drive the gear 260 of the body of screw to rotate synchronously, so that the body of screw 510 will rotate along with. As the body of screw 510 is provided with bi-directional threads, which cause the upper and lower blade carrier devices 600 and 700, that are mounted on the body of screw 510, move upward and downward oppositely, so that the upper blade 795 and the lower blade 695, which are mounted on the front ends 790 and 690 of the upper blade carrier 710 and the lower blade carrier 610 respectively, to move downward and upward respectively, to contact the rotating food frictionally, and to peel off the pericarp from top and bottom simultaneously.

FIG. 32(B) illustrates the state of the double blade peeling device is according to the invention, in which the peeling device moving to the middle portion, by turning the handle 430 to one position, the two blade carrier devices 600 and 700 approach each other gradually. During the course of peeling, the upper and lower pivots 794 and 694 make the upper and lower blade rests 693 and 793, upper and lower blades 695 and 795, and the upper and lower roller 696 and 796 to move against the surface of vegetable or fruit, but the upper and lower roller 696 and 796 can rotate along the surface of the vegetable or fruit, such that the peel that is cut out is thinner and more accurate.

FIG. 32(C) illustrates the state of the double blade peeling device according to the invention, in which the peeling device achieves peeling, when the two blade carrier devices 600 and 700 move to the central position, that is, the peeling is completed, with the lower wedge 734 in the upper blade carrier device 700 entering into the lower blade control hole 682, the wedge 734 contacts the lower blade pressure wheel 612 in the lower blade carrier 610, when the upper blade carrier device 700 continues to move downward, the lower wedge 734 designed of triangle shape drives the lower blade pressure wheel 612 to rotate and the lower blade carrier 610 to open outward gradually. The lower blade carrier 610 or the lower blade pressure wheel 612 has a function of reducing the friction. The opening of the lower blade carrier 610 is along the lower pivot 632 in the lower blade carrier. The lower support 643 is functioned as making the opened lower blade carrier 610 to remain in the original fulcrum 633, and making the lower blade carrier 610 return to the original position when the lower wedge 734 exits. Similarly, when the upper wedge 684 in the lower blade carrier device 600 entering into the upper blade control hole 736, the wedge 684 contacts the upper blade pressure wheel 712 in the upper blade carrier 710, when the lower blade carrier device 600 continues to move upward, the upper wedge 684 designed of triangle shape drives the upper blade pressure wheel 712 to rotate and the upper blade carrier 710 to open outward gradually. The upper blade carrier 710 or the upper blade pressure wheel 712 has a function of reducing the friction. The opening of the upper blade carrier 710 is along the upper pivot 732. The upper support 743 is functioned as remaining the opened upper blade carrier 710 in the original fulcrum 733, and making the upper blade carrier 710 returns to the original position when the upper wedge 684 exits. At last, the opening of the upper and lower blade carriers 710 and 610 cause the blades to leave the surface of food, at the same time, the engagement of the upper and lower blade carrier devices 700 and 600 causes the lower blade control wedge 735 to enter into the control open 683, the triangle shape of control wedge 735 makes the contacted lower blade control seat 663 to be pressed to lower position, so that the bulge 661 of the lower blade toothed plate exits the hole 631 for the lower slider seat accordingly, the lower blade carrier 600 disengages with the body of screw 510. When user continues to turn the handle 430, the body of screw 510 drives the upper blade carrier device 700 to press the lower blade carrier device 600 to move downward. Though the lower toothed plate pressure bar 671 of the lower torsion spring 670 is pressed down, once the lower toothed plate control wedge 735 is left, the lower torsion spring 670 biases the lower toothed plate 660 to return to original state. As the upper and lower blade carrier devices 600 and 700 move to the bottom, if turning the handle 430, the upper and lower blade carrier 600 and 700 along with the body of screw will slide on the spot, performing protective function, and one working circle of peeling is completed.

After peeling, the user pulls the handhold 820; the subjacent compression spring 830 will be compressed such that the upper axis rises accordingly. At the same time, by pushing the mandrill 320, the U shaped element 321 may be arisen to cause the above top support 340 and compressed spring 350 to rise, so that the top element 370 rises and the top flange 371 can push the peeled vegetable or fruit out. In addition, if it is required to take down the two blade carrier devices 600 and 700 to clean, if only pressing the lower blade stop knob 620 and the upper blade stop knob 720 respectively, the lower blade carrier device 600 and upper blade carrier device 700 may be disengaged with the body of screw 510. The reason is that after pressing the lower blade stop knob 620, the arcuate pressure slider 621 moves down to touch arcuate slider seat 662, so that the lower toothed plate 660 is pressed to a lower position slowly, the bulge 661 of the lower toothed plate exits the through hole 631 for the lower slider seat accordingly, the lower blade carrier device 600 is disengaged with the body of screw 510. At this time, the lower toothed plate pressure bar 671 of the torsion spring 670 is still pressed down, once releasing the lower blade stop knob 620, the lower torsion spring 670 may bias the lower toothed plate 660 to return to original state. Similarly, after pressing the upper blade stop knob 720, the arcuate pressure slider 721 moves down to touch arcuate slider seat 762, so that the upper toothed plate 760 is pressed to a lower position slowly, the bulge 761 of the upper toothed plate 760 exits the through hole 731 for the upper slider seat accordingly, the upper blade carrier device 700 is disengaged with the body of screw 510. At this time, the torsion spring 770 for the upper slider seat is extended, once releasing the upper blade stop knob 720, the upper torsion spring 770 may bias the lower toothed plate 660 to return to the original state.

It wil thus be seen from the above described structure, the invention provided a novel design, that is more convenient to operate, by turning the handle 430 to drive internal gears to rotate, the vegetable or fruit in the retaining member can be rotated, and the body of screw 510 provided with double threads is rotated as well. The body of screw 510 drives upper and lower blade carriers 610 and 710 mounted on the body of screw 510 to move upward and downward oppositely and respectively, so as to make the blades 696 and 795 mounted on the upper and lower blade carriers 610 and 710 move downward and upward respectively, contacts the rotating food frictionally, and peels the food from upside and underside simultaneously. When two blade carriers 610 and 710 move to the central position, that is, the peeling action is completed, the two blade carriers 610 and 710 open through wedge 684, 734 in blade carrier devices 600 and 700, two blades 695 and 795 leave the surface of food. The lower blade carrier device 600 disengages with body of screw 510. The body of screw 510 drives upper blade carrier device 700 to press the lower blade carrier device 600 to move downward unceasingly. When the upper and lower blade carrier device 600 and 700 move to bottom, one peeling cycle is completed. According to above description, It is contemplated the invention overcomes the many disadvantages of conventional peeling device for vegetable and fruit. The conventional peeling devices have the risk to be cut, besides the device is slow and overmuch flesh can be peeled.

What is claimed is:

1. A double blade peeling device for vegetable and fruit, comprising:
   a lower cover disposed on bottom;
   a gear assembly mounted on said lower cover, through turning a handle the gears in said gear assembly can be driven to rotate;
   a retaining member for vegetable and fruit disposed on said gear assembly, vegetable or fruit mounted on said retaining member being rotated through driving said gear assembly;
   a housing disposed above said lower cover;
   a frame with two blade carriers being located on one end of the housing, said frame being provided with a body of screw, that can be driven by said gears assembly;
   a lower carrier device mounted on said frame and meshed with said body of screw, said lower carrier device being pressed against a rotating food and move upward;
   an upper carrier device mounted on said frame and meshed with said body of screw, said upper carrier device being pressed against the rotating food and move downward; and
   a pressure block mounted on the topmost end.

2. The double blade peeling device of claim 1, wherein said gears assembly is provided with a plurality of gears with different dentations, which engaged with each other such that all of gears can rotate synchronously, resulting in a gear of said body of screw and a small sector gear of said retaining member can rotate synchronously, while vegetable or fruit rotates, said body of screw rotates synchronously.

3. The double blade peeling device of claim 1, wherein said retaining member is just located in the center of the small sector gear, a lower axis is fitted in a through hole in a top element and a top support, on top of cylindrical body of said lower axis is provided with several steel needles, a narrower lower portion of the body is below a central hole of a cap element, an intermediate portion of the body is provided with a transverse axis, a lowermost end of the body is provided with a flat and rounded rectangle hole, which may engage with a metal pole projecting from an upper surface of gearbox, circular top of the top element extends outwardly and deviously and forms a cap-liked element, under the top element is provided with a top support, the cylindrical base of which extends and forms a lower edge, additionally, on both side of top end of the support are provided with fasteners, a pressure spring is located between the top element and the top support, below the top support is provided with a U-shaped mandrill.

4. The double blade peeling device of claim 1, wherein said housing is shaped as a calabash, a top surface of the housing is a circular and recessed open, that can contain the blade carrier, there are four boltholes at the four corners of said open, on the lower surface of the housing is provided with a through hole, through which the retaining member can be embedded into the lower cover.

5. The double blade peeling device of claim 1, wherein said body of screw is mounted on the intermediate portion of the frame, the intermediate section of said body of screw is provided with a bi-directional screw thread, two ends of the screw are a cylinder with a smaller diameter, the shape of the lower end is a circular, in which one small edge is cut, the lower end can be fit into an central hole of the gear of the body of screw, the upper and lower ends of the body of screw are provided a bushing, the front and rear of the frame is a front post and a rear post, both of which include a C-shaped, plastic plate.

6. The double blade peeling device of claim 1, wherein said lower blade carrier device comprises: a lower blade carrier, a lower blade stop knob, a lower slider seat, a lower torsion spring, a lower blade pivot, a lower toothed plate, a torsion spring for the lower slider seat, and a cover plate for lower slider seat.

7. The double blade peeling device of claim 6, wherein said lower blade carrier is a hollow and arcuate, on a tail end of the lower blade carrier is provided with a lower pressure wheel, made of plastic, a front end of the lower blade carrier is provided with a lower blade seat, a lower blade front cover, a lower blade rest, a lower pivot for the blade rest, a lower blade and a lower roller, the lower blade seat is C-shaped, the center of which is provided with a through hole, the lower blade front cover is shaped to be inserted into the recess of the lower blade seat comlementary, a fastener of the front cover, which is projected from the bottom, just fits into said through hole, the lower blade rest is a rectangular plate, the center of which is provided with a hole, through which said lower blade pivot is attached to the blade rest and the front cover, the lower blade is a C-shaped one, which located on the bottom of said lower blade rest, the lower roller is just disposed in front of said lower blade.

8. The double blade peeling device of claim 6, wherein the tail end of said lower stop knob is curved and located at lower toothed plate slider in the lower slider seat, the lower toothed plate slider is just above the lower toothed plate slider seat, the lower blade stop knob is attached to the low blade carrier through the lower knob pivot, allowing the lower stop knob swing upward and downward along the lower pivot, that is a metal shaft.

9. The double blade peeling device of claim 6, wherein said lower slider seat is provided with a through hole, on the lower portion of left side of the lower slider seat is provided with a lower torsion spring, a tail end of which is extended and formed as a pressure bar, said lower blade toothed plate is disposed in the lower slider seat, the V-shaped portion of said toothed plate surrounding the through hole of the lower slider seat, the tooth of said toothed plate protruding into the said through hole, a lower portion of left side the lower blade toothed plate is just against said pressure bar, the lower portion of right side of which protrudes and forms as an arcuate toothed plate slide seat, the top portion of right side of which protrudes and forms a trapeziform toothed plate control seat, on a lower portion of right side of the lower slider seat is provided with a inner pivot, said lower torsion spring is disposed in the arcuate and hollow portion of the lower blade carrier, the inner bushing of which is set on the inner pivot, so that the lower blade carrier and the lower blade stop knob is mounted on the same location, the downward extending pivot is mounted on a fulcrum, which is at lower portion of right side of the lower slider seat, the ring in tail end is formed as a outer bushing, which is just set on the outer pivot in the lower blade carrier.

10. The double blade peeling device of claim 6, wherein said cover plate of said lower slider seat is shaped as same as the shape of the lower slider seat, in the center of the cover plate is provided with a through hole, lower portion of left side of the cover plate is provided with a rectangular hole for restraining, on middle portion of right side of the cover plate is provided with a rectangular open for controlling, below the open is provided with a trapezium, upper wedge.

11. The double blade peeling device of claim 1, wherein said upper blade carrier device comprises: an upper blade carrier, an upper blade stop knob, an upper slider seat, an upper torsion spring, an upper knob pivot, an upper toothed plate, a tension spring for the upper slider seat, and a cover plate for the upper slider seat.

12. The double blade peeling device of claim 11, wherein said upper blade carrier is arcuate and hollowed, on the tail end of the upper blade carrier is provided with a pressure wheel of plastic, the front end of the upper blade carrier is provided with an upper blade seat, an upper blade front cover, an upper blade rest, an upper pivot for the blade rest, an upper blade and an upper roller, the upper blade seat is C-shaped, the center of which is provided with a through hole, the upper blade front cover is shaped to be inserted into the recess of the upper blade seat comlementary, a fastener of the upper front cover, which is projected from the bottom, just fits into said through hole, the upper blade rest is a rectangular plate, the center of which is provided with a hole, through which said upper pivot is attached to the blade rest and the front cover, the upper blade is a C-shaped one, which located on the bottom of said upper blade rest, the upper roller is just located in front of the upper blade.

13. The double blade peeling device of claim 11, wherein the tail end of said upper blade stop knob is curved and located at the upper toothed plate slider in the upper slider seat, the upper toothed plate slider is just above the upper toothed plate sliding seat, the upper stop knob is attached to the upper blade carrier through the upper knob pivot, allowing the upper stop knob swing upward and downward along the upper knob pivot that is a metal shaft.

14. The double blade peeling device of claim 11, wherein said upper slider seat is provided with a through hole, on upper portion of left side of the upper slider seat is provided with an upper tension spring, tail end of which is attached to a connector of the upper toothed plate, said upper toothed plate is disposed in the upper slider seat, the V-shaped outline of said plate surrounding the through hole, the tooth of the upper toothed plate protruding into the said through hole, on bottom of left side of the upper toothed plate is projected and formed an arcuate sliding seat, on top of left side of said upper toothed plate is the connector, on lower portion and left side of the upper slider seat is provided with a inner pivot, said upper tension spring is disposed in an arcuate and hollowed portion in the upper blade carrier, an inner bushing of which is set on the inner pivot, so that the upper blade carrier and the upper stop knob is mounted on the same location, the downward extending pivot is mounted on the fulcrum that is at lower portion of left side of the upper slider seat, the ring in tail end is formed as a outer bushing, which is just set on the outer pivot within the upper blade carrier.

15. The double blade peeling device of claim 11, wherein the upper cover plate of the upper slider seat is shaped as same as that of the upper slider seat, in the center of the upper cover plate is provided with a through hole.

16. The double blade peeling device of claim 1, wherein said through hole in the tail end of said upper pressure block is just set on said frame, in front end of said pressure block are provided with, from above to below, a handhold, a compress spring, and an upper axis that can be rotated, the body of the handhold is cylinder, the top of which extending outward to form as a cap-liked structure, the compress spring is set on the narrower upper section of the upper axis, the bigger lower section of which is provided with a multiple of steel needles.

\* \* \* \* \*